United States Patent
Rasmussen et al.

(10) Patent No.: US 9,141,415 B2
(45) Date of Patent: *Sep. 22, 2015

(54) METHOD FOR DYNAMICALLY TRANSFORMING THE BYTECODE OF JAVA VIRTUAL MACHINE BOOTSTRAP CLASSES

(75) Inventors: Michael Rasmussen, Odense (DK); Allan Raundahl Gregersen, Odense (DK); Bo Norregaard Jorgensen, Odense (DK)

(73) Assignee: Syddansk Universitet, Odense M (DK)

( * ) Notice: Subject to any disclaimer, the term of this patent is extended or adjusted under 35 U.S.C. 154(b) by 77 days.

This patent is subject to a terminal disclaimer.

(21) Appl. No.: 13/885,915

(22) PCT Filed: Nov. 2, 2011

(86) PCT No.: PCT/EP2011/069254
§ 371 (c)(1),
(2), (4) Date: May 28, 2013

(87) PCT Pub. No.: WO2012/065845
PCT Pub. Date: May 24, 2012

(65) Prior Publication Data
US 2014/0075422 A1    Mar. 13, 2014

Related U.S. Application Data

(60) Provisional application No. 61/414,029, filed on Nov. 16, 2010.

(51) Int. Cl.
*G06F 9/45* (2006.01)
*G06F 9/455* (2006.01)
*G06F 9/445* (2006.01)

(52) U.S. Cl.
CPC .............. *G06F 9/45516* (2013.01); *G06F 8/67* (2013.01)

(58) Field of Classification Search
None
See application file for complete search history.

(56) References Cited

U.S. PATENT DOCUMENTS 6,260,068 B1 *  7/2001  Zalewski et al. .............. 709/226
7,293,259 B1 * 11/2007  Dmitriev ...................... 717/158

(Continued)

OTHER PUBLICATIONS

Factor, et al., "Instrumentation of Standard Libraries in Object-Oriented Languages: the Twin Class Hierarchy Approach"; 2004 ACM; [retrieved on Jul. 1, 2015]; Retrieved from Internet< URL:http://dl.acm.org/citation.cfm?id=1028976.1029000>;pp. 288-300.*

(Continued)

*Primary Examiner* — Xi D Chen
(74) *Attorney, Agent, or Firm* — Houston & Associates, LLP

(57) ABSTRACT

A method for dynamically transforming bytecode of Java Virtual Machine (JVM) bootstrap classes during program startup uses a JVM agent to intercept startup of a JVM compliant computer program to transform the bytecode of already loaded JVM bootstrap classes and store the resulting set of modified bootstrap classes. Subsequently, the JVM Agent intercepts all class loading events to transform the bytecode of classes declaring special program startup method "<clinit>", by inserting bytecode at the beginning of the method to invoke a callback method declared within the JVM Agent and passing the arguments passed to the JVM upon program startup as callback method parameters. Subsequently, when the callback method intercepts the execution flow of the computer program, the callback method starts a second JVM instance, passing parameters including the obtained input parameters, the main method arguments, and a JVM input argument for accessing the stored set of modified bootstrap classes.

22 Claims, 2 Drawing Sheets

(56) References Cited

U.S. PATENT DOCUMENTS

| | | | | |
|---|---|---|---|---|
| 7,293,260 | B1* | 11/2007 | Dmitriev | 717/158 |
| 7,415,712 | B2* | 8/2008 | Hunt | 717/159 |
| 7,426,720 | B1* | 9/2008 | Fresko | 717/153 |
| 7,512,935 | B1* | 3/2009 | Cobb | 717/130 |
| 7,793,265 | B2* | 9/2010 | Alpern et al. | 717/159 |
| 7,793,266 | B2* | 9/2010 | Alpern et al. | 717/159 |
| 7,823,137 | B2* | 10/2010 | Chagoly et al. | 717/158 |
| 8,423,977 | B2* | 4/2013 | Mercer et al. | 717/153 |
| 8,464,225 | B2* | 6/2013 | Greifeneder | 717/158 |
| 8,510,723 | B2* | 8/2013 | Barua et al. | 717/159 |
| 8,732,670 | B1* | 5/2014 | Daudel et al. | 717/158 |
| 8,762,965 | B2* | 6/2014 | Alpern et al. | 717/153 |
| 8,769,518 | B1* | 7/2014 | Daudel et al. | 717/166 |
| 8,863,093 | B1* | 10/2014 | Chou et al. | 717/130 |
| 8,887,141 | B2* | 11/2014 | Day et al. | 717/153 |
| 2002/0049963 | A1* | 4/2002 | Beck et al. | 717/130 |
| 2004/0015921 | A1* | 1/2004 | Daynes et al. | 717/153 |
| 2004/0153996 | A1* | 8/2004 | Boykin et al. | 717/118 |
| 2004/0158819 | A1* | 8/2004 | Cuomo et al. | 717/159 |
| 2006/0271395 | A1* | 11/2006 | Harris et al. | 705/1 |
| 2008/0276227 | A1* | 11/2008 | Greifeneder | 717/130 |
| 2011/0067013 | A1* | 3/2011 | Frost et al. | 717/148 |
| 2014/0059527 | A1* | 2/2014 | Gagliardi | 717/166 |

OTHER PUBLICATIONS

Pina, et al., "Rubah DSU for Java on a Stock JVM"; 2014 ACM;[retrieved on Jul. 1, 2015]; Retrieved from Internet<URL:http://dl.acm.org/citation.cfm?id=2660193.2660220>;pp. 288-300.*

IBM, "Method and Apparatus for Dynamic Inclusion of Profiling Functionality's in Java Classes"; 2004, IP.com; [retrieved on Jul. 1, 2015]; Retrieved from Internet< URL:https://iq.ip.com/preview.html?docid=ipcompad.IPCOM000024639D>;pp. 1-5.*

IBM, "Bootstrap provider for Java Security"; 2003, IP.com; [retrieved on Jul. 1, 2015]; Retrieved from Internet< URL:https://iq.ip.com/preview.html?docid=ipcompad.IPCOM000016207D>;pp. 1-2.*

Binder, W., et al., "Advanced Java Bytecode Instrumentation," Proceedings of the 5th International Symposium on Principles and Practice of Programming in Java, ACM, 2007, pp. 135-144.

Factor, M., et al., "Instrumentation of Standard Libraries in Object-Oriented Languages: the Twin Class Hierarchy Approach," Proceedings of the 19th Annual Conference on Object-Oriented Programming, Systems, Languages, and Applications, ACM, 2004, pp. 288-300.

Gregersen, A. R., et al., "Dynamic update of Java applications-balancing change flexibility vs programming transparency," Journal of Software Maintenance and Evolution: Research and Practice, vol. 21, No. 2, 2009, pp. 81-112.

Villazón, A., et al., "Advanced Runtime Adaptation for Java," Proceedings of the 8th International Conference on Generative Programming and Component Engineering, ACM, 2009, pp. 85-94.

Würthinger, T., et al., "Improving Aspect-Oriented Programming with Dynamic Code Evolution in an Enhanced Java Virtual Machine," Proceedings of the 7th ECOOP Workshop on Reflection, AOP and Meta-Data for Software Evolution (RAM-SE '10), ACM, 2010, pp. 1-5.

International Search Report mailed Jan. 25, 2012, from International Application No. PCT/EP2011/069254, filed on Nov. 2, 2011.

"Jdk 1.6 API documentation," Java™ Platform Standard Ed. 6, Oracle and/or its affiliates, 1993, 2011, 10 pages.

International Preliminary Report on Patentability and the Written Opinion of the International Searching Authority issued May 21, 2013, from counterpart International Application No. PCT/EP2011/069254, filed on Nov. 2, 2011.

* cited by examiner

METHOD FOR DYNAMICALLY TRANSFORMING THE BYTECODE OF JAVA VIRTUAL MACHINE BOOTSTRAP CLASSES

RELATED APPLICATIONS

This application is a §371 National Phase Application of International Application No. PCT/EP2011/069254, filed on Nov. 2, 2011, now International Publication No. WO 2012/065845 A1, published on May 24, 2012, which International Application claims the benefit under 35 U.S.C. §119(e) of U.S. Provisional Application No. 61/414,029, filed on Nov. 16, 2010, both of which are incorporated herein by reference in their entirety.

FIELD OF THE INVENTION

The present invention relates to the ability to perform bytecode transformations to enable user-defined customizations of the behavior of computer programs running on top of an unmodified JVM. More particularly, the present invention enables transparent bytecode transformations of the special JVM bootstrap classes in order to obtain full bytecode coverage of user-defined customizations for existing classes. With the present invention, computer programs requiring bytecode transformations of the foresaid bootstrap classes, beyond the capabilities of the current Java HotSwap mechanism, no longer have to use an off-line transformation tool that performs the required bytecode transformations statically to the bootstrap classes before the computer program can be started on the JVM with the modified bootstrap classes. Rather, the present invention enables transparent on-line bytecode transformations and automatic program execution with the set of hereby dynamically modified bootstrap classes.

BACKGROUND OF THE INVENTION

Altering the semantics of a JVM compliant computer program via bytecode transformation is a well-known practice. Bytecode transformation has been used for many purposes, especially to enhance programs with new capabilities and or add monitoring or profiling. A widespread objective when applying bytecode transformation is full bytecode coverage of the bytecode being executed in the JVM, meaning that every class loaded into or as part of the JVM should be intercepted by the bytecode transformer to permit bytecode modifications. In contrast, incomplete bytecode coverage would cause a lack of bytecode enhancement for parts of the program that depends on modifications of parts which cannot be changed by current available techniques. Currently, many available techniques for bytecode transformation are limited in their support for full bytecode coverage. Firstly, certain core classes (the special bootstrap classes) of the JDK are completely excluded from instrumentation because they are loaded before bytecode transformation can take place. Consequently, the bytecode executed within these classes corresponds to the unmodified versions of the classes. Secondly, because of the first cause, transformation of boot-classes has to be performed statically meaning the whole method has to be transformed prior to execution.

The JDK 1.5 has introduced a mechanism, Java language instrumentation agents (package java.lang.instrument), to transform classes as they are being loaded. Even though instrumentation agents are loaded and executed before the class containing the main(String[ ]) method, these agents are loaded only after the JVM has completed bootstrapping. At this stage of the execution, already several hundred classes have been loaded but have not been processed by any instrumentation agent. The JDK offers a mechanism to redefine these pre-loaded classes, which however imposes several strong limitations on class redefinition, as summarized in the JDK 1.6 API documentation: 'The redefinition may change method bodies, the constant pool and attributes. The redefinition must not add, remove or rename fields or methods, change the signatures of methods, or change inheritance.' These limitations are far too restrictive for many instrumentation-processes, such as calling context reification, which requires the introduction of additional method arguments and therefore changes method signatures. The present invention does not suffer from these strong limitations as it enables full modification of already loaded bootstrap classes.

In [1] Binder et al. discloses the method FERRARI as a general-purpose bytecode instrumentation framework. In FERRARI it's possible to instrument all classes including the special JVM bootstrap classes. However, the method requires the bytecode modifications of the JVM bootstrap classes to be done by a special static transformation tool called FIRST. Hence, FERRARI requires users to accept a two-step process in which the application is first prepared to execute, and then the real execution can be carried out. Not only does this alter the standard usage pattern of executing Java programs, but more importantly it requires the user to remember to execute the preparation tool.

SUMMARY OF THE INVENTION

An embodiment of the present invention provides a method for transparently performing user-defined customizations of the bootstrap classes of an actively running Java Virtual Machine (JVM) on a desktop, server, mainframe, cloud computing or embedded computing device.

Specifically, under the present invention, user-defined customization of bootstrap classes no longer requires use of an off-line bytecode transformation tool that changes the bytecode of bootstrap classes before startup of the JVM. Instead, bytecode transformation of bootstrap classes is transparently performed on-line as part of startup of a JVM compliant computer program using a special instance of a JVM Agent.

The invention operates by having the said JVM Agent execute code to transform the bytecode of the already loaded JVM bootstrap classes according to the required user-defined customizations and storing the hereby-resulting set of modified bootstrap classes onto data storage.

Next, the invention has the JVM Agent intercepting intercepts all class-loading events and transforming transforms the bytecode of those classes declaring the special program startup-method with the unique method signature "public static void main(String[ ])", by inserting bytecode at the beginning of the special startup-method to call a callback method in the said JVM Agent. Furthermore, in those classes declaring the special program startup-method, the JVM Agent removes the bytecode within the body of the special class-initialize method, as defined in the present JVM class file format as "<clinit>", to avoid any side-effects in the program.

Subsequently, when the JVM hands over control to a compliant computer program's special program startup-method, the bytecode inserted therein calls the callback method on the said JVM Agent, passing as parameters the same set of arguments as passed to the JVM upon initial program startup. Then, when the callback method has control, it spawns a new operating system process executing that executes a second JVM instance, passing to it the obtained input parameters and the main method arguments, as well as a JVM input argument to use the stored set of modified bootstrap classes. On return from spawning the operating system process of the second JVM instance, the callback method executes code that waits for the process actively running the second JVM instance to terminate, before the callback method terminates the first JVM instance. In a variant of this embodiment, the tasks of the said JVM Agent are equally performed as part of a modified JVM.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope. With respect to the following drawings, like reference numbers denotes the same element throughout the set of drawings.

DETAILED DESCRIPTION OF THE INVENTION

Figure 1:
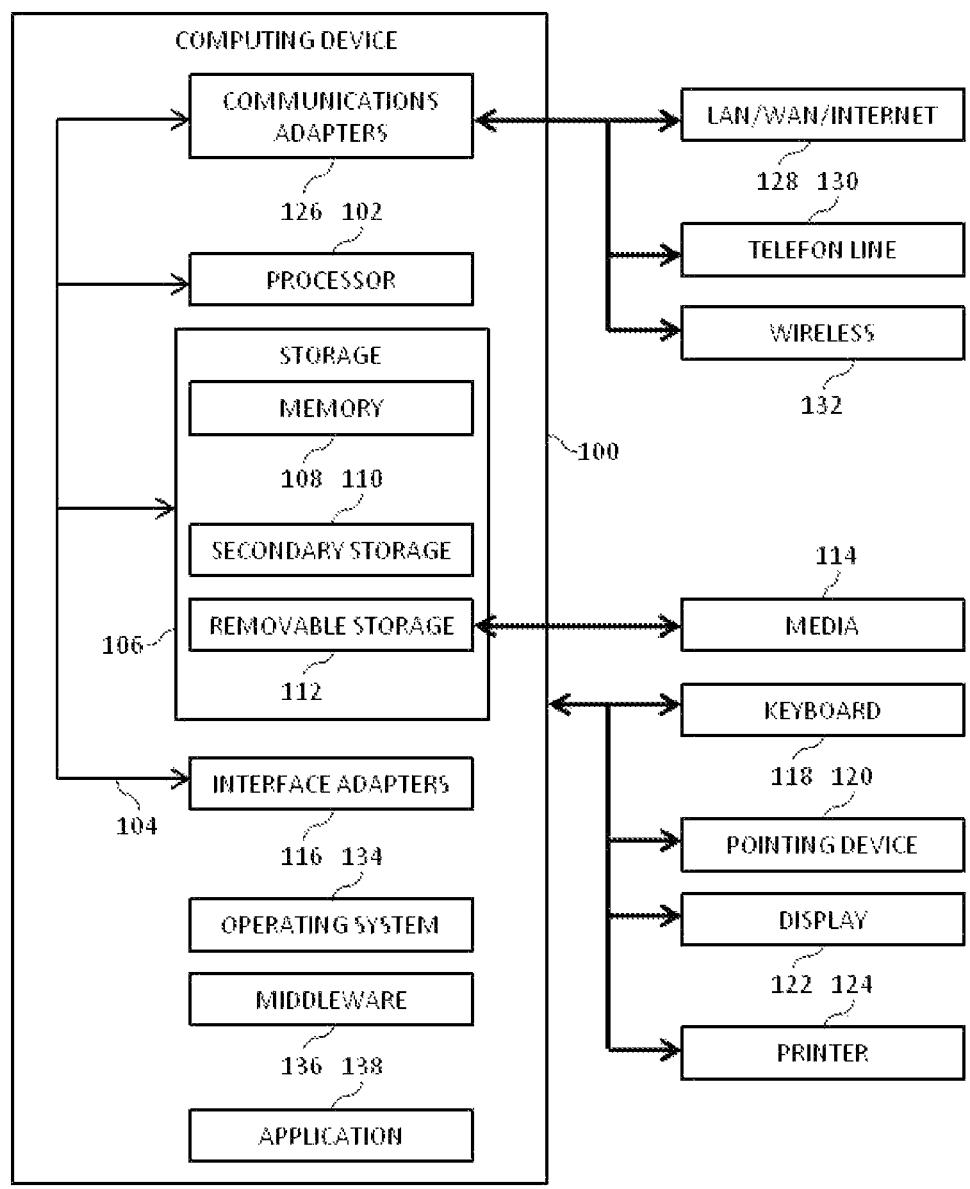
FIG. 1 is a block diagram of a generic computing device, which could be a desktop, workstation, server, mainframe computer, embedded computing device, etc., wherein the present invention may be practiced.

FIG. 1 is a block diagram of a computing device, such as a workstation, wherein the present invention may be practiced. The environment of FIG. 1 comprises a single representative computing device 100, such as a personal computer, workstation, enterprise mainframe computer, server, laptop, hand-held computer, information appliance, etc., including related peripheral devices. The computing device 110 includes a microprocessor 102 or equivalent processing capability and a bus 104 to connect and enable communication between the microprocessor 102 and the components of the computing device 100 in accordance with known techniques. Note that in some computing devices there may be multiple processors incorporated therein.

The microprocessor 102 communicates with storage 106 via the bus 104. Memory 108, such as Random Access Memory (RAM), Read Only Memory (ROM), flash memory, etc. is directly accessible while secondary storage device 110, such as a hard disk, and removable storage device 112, such as a floppy diskette drive, CD ROM drive, tape storage, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 100 may have multiple memories (e.g., RAM and ROM), secondary storage devices, and removable storage devices (e.g., floppy drive and CD ROM drive).

The computing device 100 typically includes a user interface adapter 116 that connects the microprocessor 102 via the bus 104 to one or more interface devices, such as a keyboard 118, a mouse or other pointing device 120, a display 122 (such as a CRT monitor, LCD screen, etc.), a printer 124, or any other user interface device, such as a touch sensitive screen, digitized entry pad, etc. Note that the computing device 100 may use multiple user interface adapters in order to make the necessary connections with the user interface devices.

The computing device 100 may also communicate with other computing devices, computers, workstations, etc. or networks thereof through a communications adapter 126, such as a telephone, cable, or wireless modem, ISDN Adapter, DSL adapter, Local Area Network (LAN) adapter, or other communications channel. This gives the computing device direct access to networks 128 (LANs, Wide Area Networks (WANs), the Internet, etc.), telephone lines 130 that may be used to access other networks or computers, wireless networks 132, such cellular telephone networks, and other communication mechanisms. Note that the computing device 100 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc. All these configurations, as well as the appropriate communications hardware and software, are known in the art.

The computing device 100 provides the facility for running software, such as Operating System software 134, Middleware software 136, and Application software 138. Note that such software executes tasks and may communicate with various software components on this and other computing devices.

As will be understood by one of ordinary skill in the art, computer programs such as that described herein (including Operating System software 134, Middleware software 136, and/or Application software 138) are typically distributed as part of a computer program product that has a computer useable media or medium containing or storing the program code. Therefore, "media", "medium", "computer useable medium", or "computer useable media", as used herein, may include a computer memory (RAM and/or ROM), a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

It will be likewise appreciated that the computer hardware upon which the invention is effected contains one or more processors, operating together, substantially independently, or distributed over a network, and further includes memory for storing the instructions and calculations necessary to perform the invention.

Those skilled in the art will recognize that a method according to the present invention may be created in a variety of different ways known in the art. For example, a general purpose computing device as described in FIG. 1 may be configured with appropriate software so that the computing device functions as described hereafter. Furthermore, discrete electronic components may be used to create a system or computer program product that implements all or part of the functional. Finally, note that combinations of multiple computing devices running appropriate software or discrete electrical components can be used in like fashion. Essentially, the hardware is configured (whether by software, custom designed, etc.) to perform the functional elements making up the present invention.

Figure 2:
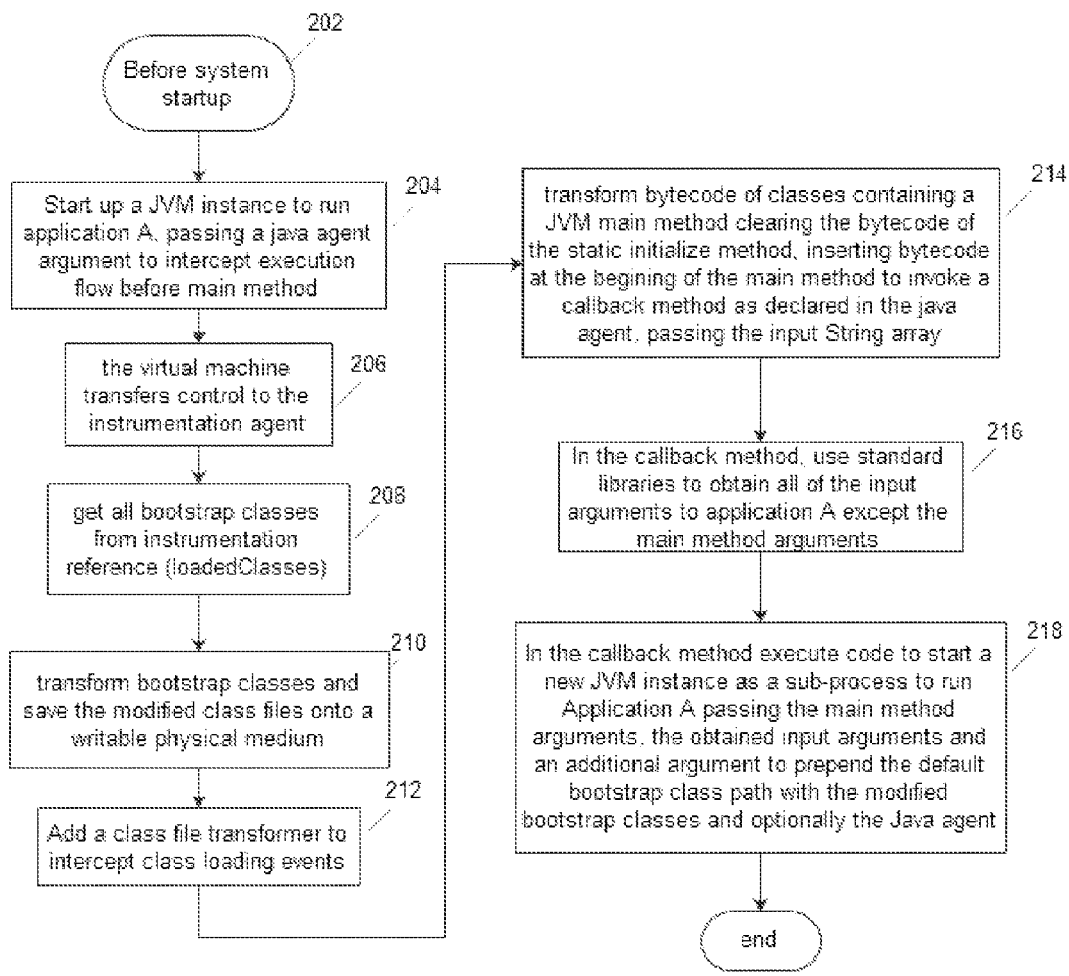
FIG. 2 is a flowchart showing the steps taken to dynamically instrument the bytecode of bootstrap classes.

FIG. 2 is a flowchart showing the steps taken to transparently transform the bytecode of the special bootstrap classes, automatically executing a new program instance wherein the transformed set of bootstrap classes are prepended to the boot class path of the JVM. Initially, at 202 the flow of events is triggered by a request to start a computer program instance in the JVM. In some embodiments of the present invention, an additional input argument to setup a JVM Agent that intercepts the program execution before the execution point of the computer program startup-method is passed to the JVM 204. In 206 the virtual machine transfers control to the JVM Agent as specified as the additional input argument. The JVM Agent obtains a reference to the set of already loaded classes, namely the bootstrap classes in 208, transforming the bytecode of those bootstrap classes, saving the modified set of bootstrap classes onto a data storage in step 210. In step 212 the code in the JVM Agent sets up a class file transformer that intercepts the class loading process for all further class loading events in the JVM. On every class-loading event happening in the computer program, the class file transformer intercepts the class loading in 214, transforming the bytecode of specific classes wherein the special application startup-method, main(String[ ]) method, is declared. In those specific main classes the bytecode, if such bytecode exists, within the method body of the special class initialize method (<clinit>) is removed. Moreover, the class file transformer inserts bytecode at the beginning of the special program startup-method to invoke a callback method of a class declared within the Java agent, passing the main arguments to the callback method as method parameters. Once the callback method is first executed in 216, the callback method collects the remaining input arguments of the computer program. Afterwards, in 218 a new computer program instance of the said computer program is executed, on a new JVM instance within a new operating system process, with the set of obtained input arguments, the main method arguments, in addition to an argument that defines a new prepending boot class path at the location where the modified set of bootstrap classes was stored. In embodiments, the JVM Agent for the first computer program instance is passed on to the new JVM instance. Once the JVM Agent intercepts the execution flow of the new computer program instance, it determines if the special instrumentation described by steps 208-218 was already performed by the previously executed computer program instance, and if so, will skip the steps of 208-218. The callback method blocks further execution of the first computer program instance by waiting for the process running the second JVM instance to terminate. Once the second JVM instance terminates, the callback method is wakened-to terminate execution of the first computer program.

[1] W. Binder, J. Hulaas, and P. Moret. Advanced Java Bytecode Instrumentation. 5th International Symposium on Principles and Practice of Programming in Java (PPPJ-2007), Lisboa, Portugal, September 2007. ACM Press, ISBN 978-1-59593-672-1, pp. 135-144.

The invention claimed is:

1. A method for transparently re-launching a computer program, comprising:

launching a Java Virtual Machine compliant computer program from within a first running Java Virtual Machine instance initially loaded with a set of standard bootstrap classes;

transforming bytecode of the set of standard bootstrap classes in the first running Java Virtual Machine instance, according to a set of user defined customizations, into a set of modified bootstrap classes;

storing the set of modified bootstrap classes onto an alternative boot class path location at a computer data storage medium;

intercepting a loading event of bytecode on every non-bootstrap class loaded into the first running Java Virtual Machine instance and once class loading is initiated on a non-bootstrap class, determining whether the non-bootstrap class declares a special program startup method, and in response to the determination that the non-bootstrap class declares the special startup method, performing the following steps successively:

locating the bytecode of a special class initialization method, where the special class initialization method is defined in the Java Virtual Machine class file format as "<clinit>";

transforming the bytecode of the special class initialization method into a modified special class initialization method by emptying the special class initialization method's body;

inserting bytecode at the beginning of the special program startup method to intercept a set of arguments passed to the special program startup method, wherein the set of arguments are passed to the special program startup method when the special program startup method is invoked by the first running Java Virtual Machine instance upon start of the computer program's execution;

inserting bytecode at the beginning of the special program startup method to call a callback method, the calling of which redirects the special program startup method's execution flow, wherein the callback method includes the set of arguments passed to the special program startup method as parameters, and wherein the callback method: intercepts the special program startup method's execution flow on handover of control from the first running Java Virtual Machine instance, starts a second Java Virtual Machine instance, wherein the second Java Virtual Machine instance is separate and distinct from the first Java Virtual Machine instance, passes as arguments to the second Java Virtual Machine instance the set of arguments passed to the special program startup method and a Java Virtual Machine specific input argument to use the set of modified bootstrap classes that are stored onto the alternative boot class path location at a computer data storage medium, blocks further execution of the computer program upon returning from starting the second Java Virtual Machine instance, and in response to the second Java Virtual Machine instance terminating execution, the callback method awakes and terminates execution of the first running Java Virtual Machine instance.

2. The method of claim 1, wherein the transforming of the bytecode of the set of standard bootstrap classes changes the interface of some or all of the set of standard bootstrap classes.

3. The method of claim 1, wherein the transforming of the bytecode of the set of standard bootstrap classes add, modify or remove fields in some or all of the set of standard bootstrap classes.

4. The method of claim 1, wherein the transforming of the bytecode of the set of standard bootstrap classes add, modify or remove methods in the set of standard bootstrap classes.

5. The method of claim 1, wherein the transforming of the bytecode of the set of standard bootstrap classes add, modify or remove constructors in the set of standard bootstrap classes.

6. The method of claim 1, wherein the transforming of the bytecode of the set of standard bootstrap classes changes the super class of some or all of the set of standard bootstrap classes.

7. The method of claim 1, wherein the transforming of the bytecode of the set of standard bootstrap classes changes the list of implemented interfaces for some or all of the set of standard bootstrap classes.

8. The method of claim 1, wherein bytecode transformation is performed by the first Java Virtual Machine instance.

9. The method of claim 1, wherein the callback method is provided by the first Java Virtual Machine instance.

10. The method of claim 8, wherein the first running Java Virtual Machine instance performs no bytecode transformation when the first running Java Virtual Machine instance is started with an alternative boot class path.

11. The method of claim 1, wherein the bytecode transformation is performed by a Java agent.

12. The method of claim 1, wherein the callback method is provided by a Java agent.

13. The method of claim 11, wherein the Java agent is not provided as an argument to the second Java Virtual Machine instance started by the callback method.

14. The method of claim 1, wherein the first and the second Java Virtual Machine instances are compliant to the Java Virtual Machine specification.

15. A method for dynamically updating bootstrap classes of a Java Virtual Machine (JVM) running on a computing device, the method comprising:
   starting a first program instance of a computer program with an initial set of arguments and with a JVM argument referencing a Java agent for creating a first JVM instance;
   intercepting execution of the first program instance and identifying the bootstrap classes loaded by the first JVM instance;
   transforming the identified bootstrap classes into a set of transformed bootstrap classes; and
   starting a second program instance of the computer program with a new argument that refers to the set of transformed bootstrap classes to create a new JVM instance with the set of transformed bootstrap classes.

16. The method of claim 15, wherein the Java agent intercepts execution of the first program instance and identifies the bootstrap classes loaded by the first JVM instance.

17. The method of claim 15, wherein the new argument that refers to the set of transformed bootstrap classes is prepended to a boot class path argument of the second program instance.

18. The method of claim 15, wherein the Java agent registers a class file transformer for transforming the identified bootstrap classes into the set of transformed bootstrap classes.

19. The method of claim 15, wherein a callback method of the Java agent starts the second program instance to create the new JVM instance with the set of transformed bootstrap classes.

20. The method of claim 15, further comprising transforming main classes of the first program instance, and executing the transformed main classes of the first program instance to start the second program instance.

21. A method for dynamically updating bootstrap classes of a Java Virtual Machine (JVM) running on a computing device, the method comprising:
   starting a first program instance of a computer program with an initial set of arguments and with a JVM argument referencing a Java agent for creating a first JVM instance;
   intercepting execution of the first program instance and identifying the bootstrap classes loaded by the first JVM instance;
   transforming the identified bootstrap classes into a set of transformed bootstrap classes; and
   starting a second program instance of the computer program with a new argument that refers to the set of transformed bootstrap classes to create a new JVM instance with the set of transformed bootstrap classes; and
   transforming main classes of the first program instance, and executing the transformed main classes of the first program instance to start the second program instance, wherein transforming the main classes of the first program instance further comprises:
   intercepting loading of non-bootstrap classes of the first program instance;
   identifying each main class of the loaded non-bootstrap classes that declares a JVM class initialization method; and
   transforming each identified main class by removing byte-code of its declared JVM class initialization method, and by inserting byte-code at a beginning of a startup method for each identified main class, wherein the inserted byte-code includes instructions for invoking a callback method of the Java agent for starting the second program instance.

22. The method of claim 20, wherein executing the transformed main classes of the first program instance further comprises executing a startup method for each transformed main class, and wherein executing the startup method for each transformed main class invokes a callback method of the Java agent that starts the second program instance.

* * * * *